Feb. 4, 1941. T. G. MYERS 2,230,575
TRANSMISSION MECHANISM
Filed June 11, 1937 3 Sheets-Sheet 1

INVENTOR
Thomas G. Myers
BY John Flam
ATTORNEY

Feb. 4, 1941.　　　T. G. MYERS　　　2,230,575
TRANSMISSION MECHANISM
Filed June 11, 1937　　　3 Sheets-Sheet 2
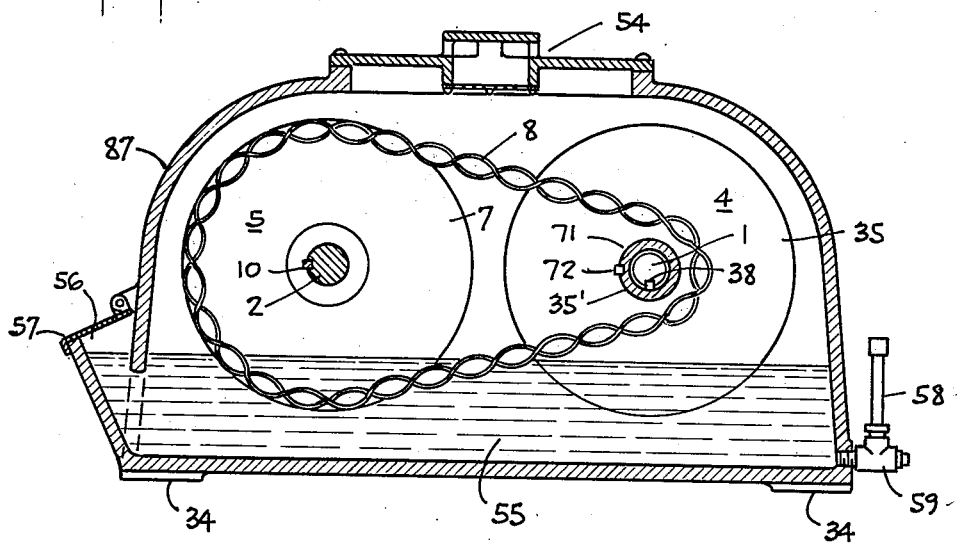
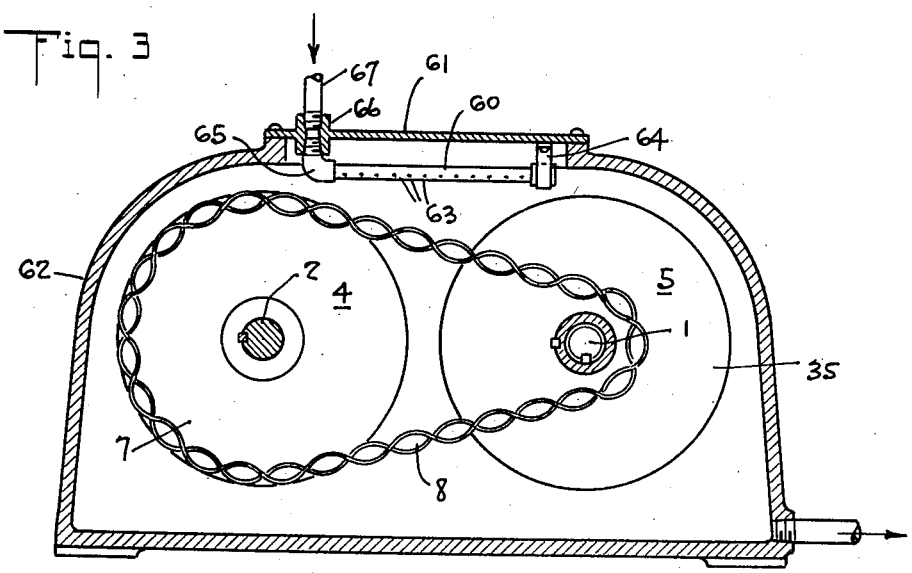
INVENTOR
Thomas G. Myers
BY John Flam
ATTORNEY

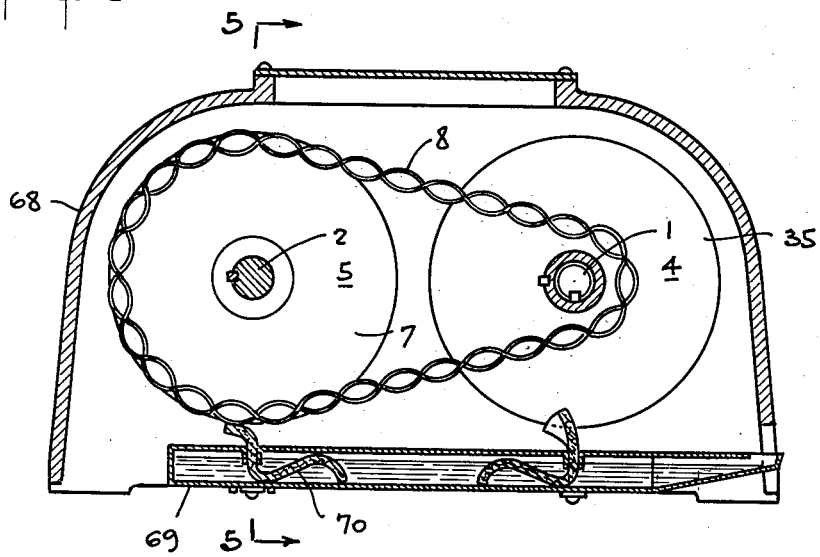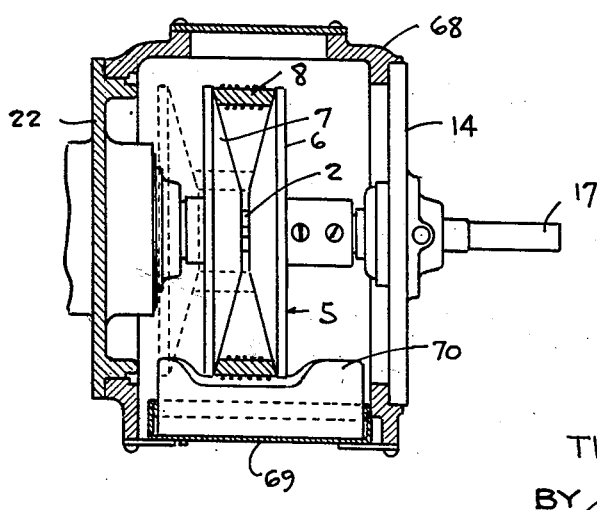

Patented Feb. 4, 1941

2,230,575

UNITED STATES PATENT OFFICE 2,230,575

TRANSMISSION MECHANISM

Thomas G. Myers, Los Angeles, Calif., assignor to U. S. Electrical Motors, Inc., Los Angeles, Calif., a corporation of California Application June 11, 1937, Serial No. 147,725

2 Claims. (Cl. 74—230)

This invention relates to a transmission mechanism, and more particularly to a belt drive in which the edges of the belt provide driving contact with pulleys of the V-type.

The use of such belts is described in connection with pulley structures of variable diameters, in Patent No. 2,078,196, granted to Don Heyer, on April 20, 1937, and entitled: "Variable speed power unit." This patent illustrates a variable transmission that is enclosed by a protective casing. The pulley structures are shown therein as comprising a pair of relatively axially adjustable pulley sections having opposed inclined faces. As the pulley sections are brought closer together, the belt moves radially outwardly to contact the inclined faces on a band having a larger diameter, and the effective diameter of the pulley structure is increased. Conversely, when the pulley sections are moved farther apart, the belt is permitted to move radially inwardly to contact the inclined faces on a band having a smaller diameter, and the effective diameter of the pulley structure is decreased.

The constant friction between the belt and the pulley sections, and the constant flexing and unflexing of the belt as a portion of it passes into and out of contact with the pulley, generates waste heat. In an open type of transmission, this heat may be dissipated quite satisfactorily; and even when the transmission is enclosed, ventilating and air circulating means may serve effectively to maintain the temperatures attained at the transmission below undesired limits. But in all such apparatus, the dissipation of heat is dependent solely upon radiation and upon convection of air currents.

It is one of the objects of this invention to improve upon these ideas, for dissipation of waste heat; and especially by employing a cooling liquid which not only serves to conduct heat, but which by evaporation, also provides a heat absorbent effect.

To accomplish this purpose, water may be effectively used as the cooling agent. It may be so employed as to contact the belt and pulley surfaces, so that heat may be conducted to the water. In addition, the water is allowed to form vapor and thereby to supplement the abstraction of the heat.

The apparatus utilized may be such that the pulleys and belt may be at least partially submerged in a body of the cooling liquid; or a spray of liquid upon the belt and pulleys may be used; or else water may be otherwise conducted as a thin layer upon the surfaces to be cooled. In order to permit free movement of the liquid without carrying it to other elements of the transmission, the belt structure is preferably such that it may readily shed any accumulation of liquid. For this reason, the belt may be made of cog elements, held together by interlacing, to form interstices for the ready passage of liquid through it.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 2 is a transverse sectional view taken along the center of the transmission case, and showing one form of the invention;

Fig. 3 is a view similar to Fig. 2, but of a modified form of the invention;

Fig. 4 is a view similar to Fig. 2, but showing a still further modification of the invention;

Fig. 5 is a vertical sectional view taken along plane 5—5 of Fig. 4;

Figure 1:
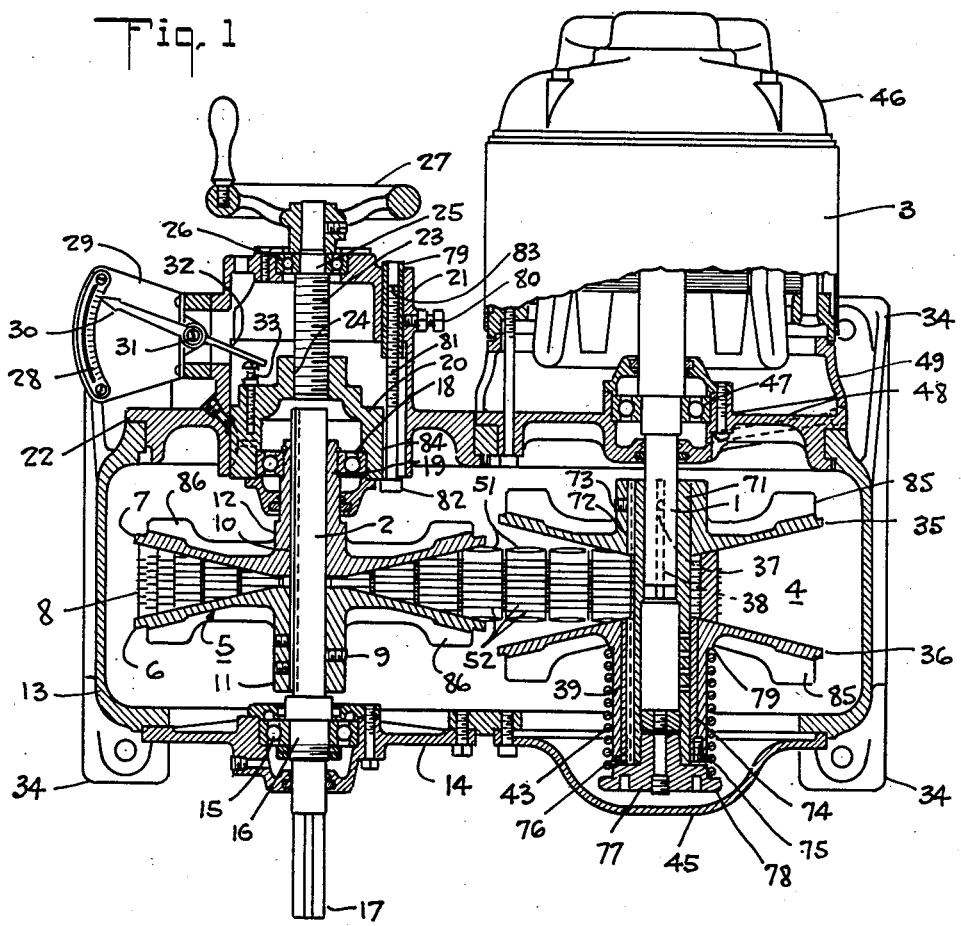
Figure 1 is a horizontal sectional view showing in general, a transmission embodying the invention.

Considering the transmission in general illustrated in Fig. 1, the transmission mechanism is shown as having a driving shaft 1 and a driven shaft 2. The driving shaft 1 is adapted to be directly driven by an electric motor 3. The driving shaft 1 may conveniently form an extension of the shaft of the motor 3.

The driving shaft 1 carries a variable diameter pulley structure 4. A similar variable diameter pulley structure 5 is carried by the driven shaft 2.

The pulley structure 5 includes a pair of pulley sections 6 and 7 which are relatively axially adjustable and which have opposed inclined faces for engaging the opposite edges of an edge active belt 8. As is well understood, if the pulley sections 6 and 7 are brought closer together, the belt 8 engages the faces of the pulley sections 6 and 7 at a larger radius from the axis of shaft 2. Similarly a separation of the two sections 6 and 7 in an axial direction will permit the belt 8 to move closer inwardly with respect to the axis of shaft 2. In this way the effective diameter of pulley structure 5 may be varied. For the position shown in Fig. 1 the pulley structure 5 has a maximum effective diameter.

In the present instance the pulley section 6 is shown as axially fixed to the shaft as by the aid of a set screw 9. A spline or key 10 passes through both of the hubs 11 and 12, to permit movement of pulley section 7 axially of shaft 2 by the aid of a manually operated mechanism, and guided by the aid of the spline 10.

The means forming a support for the shafts 1 and 2 and their related parts comprises a housing or casing 13. The driven shaft 2 is rotatably supported in a cover member 14 on one wall of the casing, as by the aid of the ball bearings 15. The outer race of this ball bearing 15 is fastened within the cover member 14. The inner race thereof is mounted on a reduced portion 16 of the shaft 2. The shaft 2 has a load driving extension 17 projecting out of the casing.

The other end of the shaft 2 is also supported by the aid of a ball bearing structure 18. This bearing structure is a combined thrust and radial bearing. The inner race of this ball bearing structure is mounted upon the reduced portion 19 of the hub 12. The outer race is mounted in a member 20 of cylindrical form. This member 20 is guided in a cup-like housing 21 formed on a member 22, which may be attached as by a breech lock to a wall of the casing 13. The member 20 is restrained against rotation within the housing 21 by any appropriate means.

Axial adjustment of the cylindrical member 20 within the housing 21 causes a corresponding axial adjustment of the pulley section 7. This axial adjustment in the present instance is shown as provided by a screw 23 engaging in a threaded axial aperture 24 in the end of the member 20. The screw 23 has a cylindrical extension 25 rotatably mounted as by the aid of a bearing structure 26 in the end of the housing member 21. The extension 25 is connected to the handwheel 27 located outside of the casing. Thus by rotating handwheel 27, screw 23 is rotated and the adjustable member 20 is correspondingly moved in an axial direction.

Means to limit the movement of the member 20 may be provided. As shown, an internally threaded tube 79 is slidably mounted in cup 21 parallel to screw 23, a set screw 80 being provided to secure the tube in adjusted position. A threaded rod 81 having a head 82 is mounted in tube 79, rotation of the rod with respect to the tube by means of a screwdriver or similar tool inserted in slot 83, serving to alter the distance between the inner end of the tube and head 82. Rod 81 extends through a slot 84 formed in member 20, the arrangement being such that the inward movement of member 20 is checked by head 82 and the outward movement by the inner end of tube 79.

If desired, the ratio of the transmission may be indicated upon a scale 28 supported on a bracket 29 which is in turn secured to the housing 21. A pointer 30 pivoted at 31 is rotated, against the action of a spring, in accordance with the motion of member 20. For this purpose the pointer 30 has an arm 32 contacting an adjustable abutment 33 carried by the member 20.

The casing 13 may be appropriately provided with the apertured foot members 34 to facilitate fastening the casing to a supporting surface.

The driving pulley structure 4 is shown in Fig. 1 as having a minimum effective diameter. As the effective diameter of pulley structure 5 is varied, the effective diameter of pulley structure 4 should be varied in an opposite sense in order to keep the belt 8 in proper driving contact with the pulley structures. In the present instance this required adjustment of pulley structure 4 is automatically effected in a manner now to be described.

The pulley structure 4 has a fixed pulley section 35 and an axially movable section 36. The pulley section 35 is secured to a sleeve 71, which is fastened to the shaft 1. Sleeve 71 is secured on shaft 1 by a key or spline 38 and a set screw 37; pulley section 35 is secured to sleeve 71 by key 72 and set screw 73. Movable pulley section 36 has a bushing 74 secured in the bore in its hub 39 in any convenient manner, as by a screw 75. The pulley section and bushing are slidable on the exterior surface of the outer portion of sleeve 71, a spline or key 76 serving to prevent relative rotation between the sleeve and pulley, but permitting the pulley to slide axially on the sleeve. A cap 77 is threaded into the end of sleeve 71 and has a peripheral flange 78, between which and a shoulder 79 on the pulley hub, a compression spring 43 is confined.

Thus, as the pulley structure 5 is adjusted for an increasing diameter, the belt 8 is drawn inwardly with respect to pulley structure 4, the section 36 is urged outwardly and the spring 43 is compressed. On the other hand, when pulley structure 5 is adjusted to decrease its effective diameter, the compression spring 43 is permitted to expand, and the pulley section 36 is urged inwardly to maintain it in contact with the belt 8. During this process of adjustment, the center plane of belt 8 moves in an axial direction, but is kept in substantial alinement, because the fixed pulley sections 6 and 35 are on opposite sides of belt 8.

The casing 13 may have a cover member 45 opposite the cap 77.

The other end of shaft 1 is mounted for rotation within the end housing 46 of the motor 3. It is also further rotatably supported by the aid of the ball bearing structure 47. This ball bearing structure is supported in the wall 48 of an end bracket member 49 for the motor 3. This end bracket member 49 may be joined as by a breech lock to one wall of the casing 13.

Both pulley structures are shown as provided with fan blades 85 and 86 to assist in cooling the assembly; these may be omitted when desirable.

Figure 7:
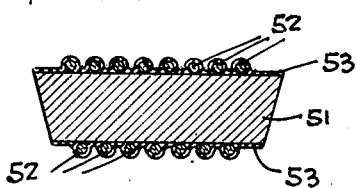
Figs. 7 and 8 are detail cross-sections of the belt, as seen on the correspondingly numbered planes of Fig. 6.
Figure 8:
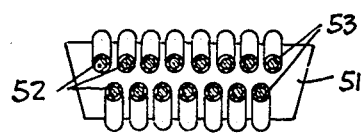
Figure 6:
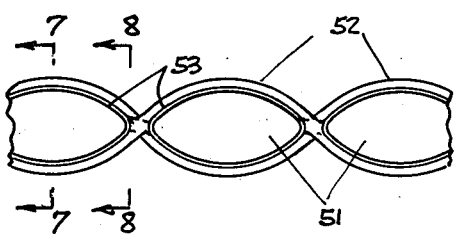
Fig. 6 is a detail view of a portion of the cog belt utilized in connection with the invention.

The structure of belt 8 is more clearly illustrated in Figs. 6 to 8, inclusive. This includes a series of cogs 51 having generally an oval cross-section in a longitudinal plane, and a wedge shape cross-section in a transverse plane. The cogs 51 are joined together by interlaced cords 52. After the interlacing, the belt structure may be overlaid with a layer of rubber 53 which, however, leaves interstices through the belt structure, (Fig. 8).

One of the problems in connection with the operation of edge-active belt transmissions is the generation of heat due to the friction between the edges of the belt 8 and the pulley surfaces; and also to the flexing and unflexing of the belt as it passes around the pulley structures. This constant friction and heat generation are detrimental to the length of life of the belt. This is especially serious in connection with enclosed transmissions, such as shown. In the present instance means are provided for passing a cool liquid directly to the belt and the contacting surfaces.

For this purpose, casing 13 may be arranged as shown at 87 (Fig. 2) to provide a well in its bottom for a body of water or other liquid 55. Into this body of liquid the pulley structures 4 and 5 are adapted to be at least partially immersed. The water is carried along the belt 8 but is drained through the interstices of the belt so that there is no serious agitation of water. At the same time the evaporation effect of the water serves very effectively to keep the pulley structures and the belt cool.

As shown in Fig. 2, the well may be filled with liquid as needed as by the aid of an inlet 56 provided with a hinged cover 57. The water level may be indicated exterior of the casing 84, as by the aid of the gauge glass 58 joined as by a tree connection 59 to the bottom of the well. A screened opening or "breather" 54 is provided on the top of the casing to permit free ingress or egress of air to the interior of the casing, but is arranged to prevent any of the liquid being thrown through it in the operation of the unit.

In the form of the invention illustrated in Fig. 3, there is no water well. Instead a spray pipe 60 is supported upon the cover 61 of the casing 62. This casing 62 is otherwise similar to casing 87. The spray pipe 60 is provided with a series of spraying apertures or openings 63 directed downwardly above the belt and pulley structures. The spray pipe 63 may be supported at one end upon the cover 61 as by the aid of the bracket 64. At its other end it may be joined to an elbow 65 threaded into the boss 66 shown as formed integral with the cover 61. A water supply pipe 67 may be threaded in the upper end of the boss 66.

The supply of cooling liquid to the parts that are subjected to the friction may be secured in still other ways. One further manner is illustrated in Figs. 4 and 5. In this case the casing 68 is shown as having an open bottom, but supporting a water container 69 in the bottom thereof. This water container may be closed except for an aperture permitting the passage of a wick 70 of absorbent material. This wick 70 is shown in contact with the surfaces of the pulley sections 6 and 7 and the belt 8, so as to pass a small quantity of liquid thereto.

In all of the forms of the invention the cooling water is evaporated and absorbs heat from the parts which are subjected to friction.

What is claimed is:

1. In a transmission mechanism utilizing an edge-active belt and a pulley structure having inclined belt engaging faces with which the belt is in driving contact, the combination therewith of means for spraying the belt surface with a cooling liquid.

2. In a transmission mechanism utilizing an edge-active belt and a pulley structure having inclined belt engaging faces with which the belt is in driving contact, said belt having interstices, the combination therewith of means for spraying the belt surface with a cooling liquid.

THOMAS G. MYERS.